(12) United States Patent
Finke-Anlauff

(10) Patent No.: US 6,580,932 B1
(45) Date of Patent: Jun. 17, 2003

(54) FOLDABLE KEYBOARD FOR MOBILE COMMUNICATIONS DEVICE

(75) Inventor: Andrea Finke-Anlauff, Braunschweig (DE)

(73) Assignee: Nokia Mobile Phones Limited, Espoo (FI)

(*) Notice: Subject to any disclaimer, the term of this patent is extended or adjusted under 35 U.S.C. 154(b) by 400 days.

(21) Appl. No.: 09/584,297

(22) Filed: May 31, 2000

(51) Int. Cl.[7] ............................. G06F 1/16; H04B 1/16
(52) U.S. Cl. .................... 455/575; 455/90; 370/433.01; 370/433.04; 370/433.7; 370/433.13; 370/434
(58) Field of Search ........................ 455/90, 556, 550, 455/575, 566, 351; 379/433.01, 433.04, 433.07, 433.13, 434; 345/169, 168

(56) References Cited

U.S. PATENT DOCUMENTS

| 5,189,632 A | * | 2/1993 | Paajanen et al. ............. 455/556 |
|---|---|---|---|
| 5,563,936 A | * | 10/1996 | Washington ................. 341/22 |
| 5,920,688 A | * | 7/1999 | Cooper et al. .............. 345/650 |
| 6,014,573 A | * | 1/2000 | Lehtonen et al. ........... 455/414 |
| 6,047,196 A | * | 4/2000 | Makela et al. .............. 455/556 |
| 6,151,012 A | * | 11/2000 | Bullister .................... 345/168 |
| 6,381,447 B1 | * | 4/2002 | Eguchi ....................... 345/168 |

* cited by examiner

Primary Examiner—Vivian Chin
Assistant Examiner—Kamran Afshar
(74) Attorney, Agent, or Firm—Perman & Green, LLP

(57) ABSTRACT

A full function keyboard is provided for use with a mobile communication device. The keyboard is constructed in two portions which may be pivoted relative to the body of the device between two positions, one in which the keyboard is hidden and the keypad of the device is exposed for normal use and a second in which the two portions of the keyboard are positioned on opposite sides of the screen of the device to allow holding with both hands and operation with the thumb.

29 Claims, 4 Drawing Sheets

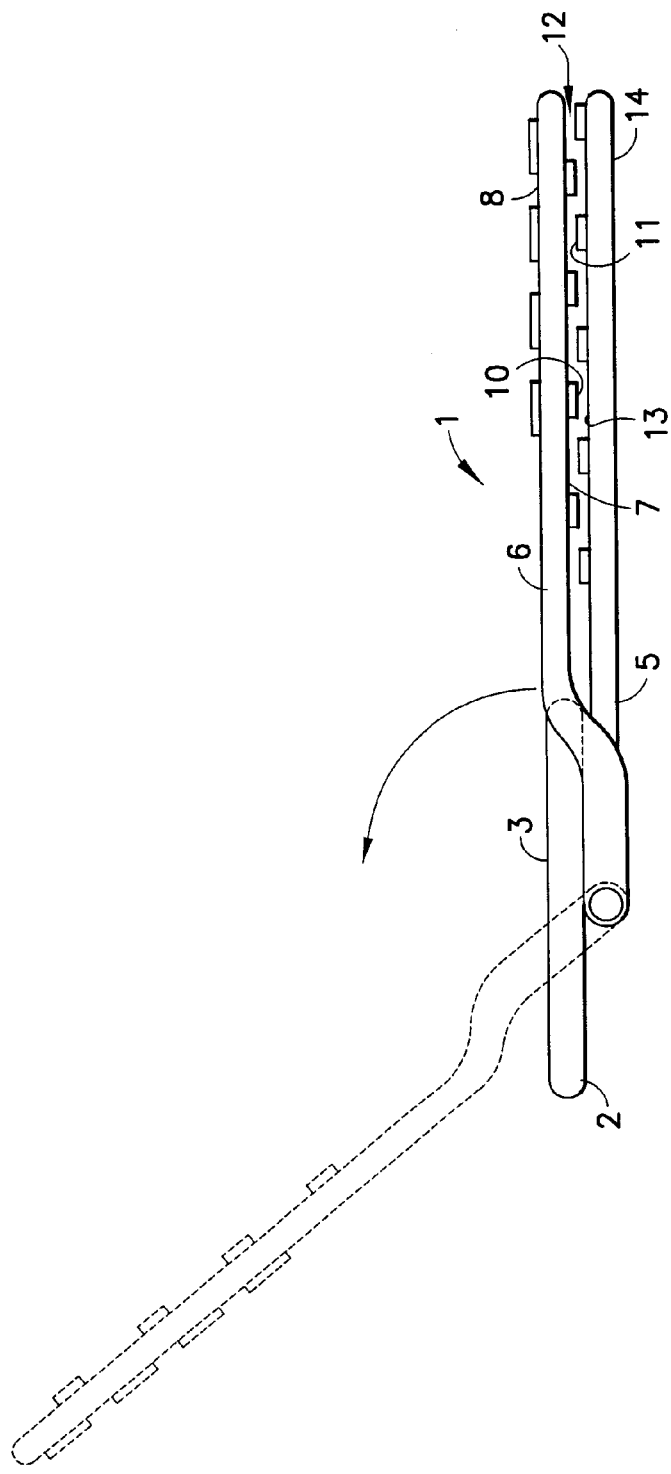
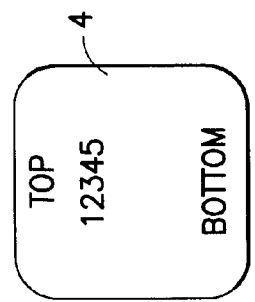
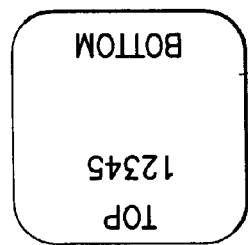

FOLDABLE KEYBOARD FOR MOBILE COMMUNICATIONS DEVICE

BACKGROUND OF THE INVENTION

Mobile telephones and similar communication devices are rapidly expanding in use and function. Such devices will soon provide Internet access, personal information management, facsimile, messaging, in addition to telephone communication. To accomplish this there is a need to provide keyboards compatible with the more complex applications to which the mobile device will be adapted. Full function keyboards, such as the standard QWERTY typing array of keys and buttons, are difficult to provide while maintaining the compact size required in the mobile device. Such devices on the market today are cumbersome and often require a separate belt pouch for carrying the mobile device on the person of the user. In addition it is necessary to coordinate on screen displays for adaptation to the variety of functions.

It is a purpose of this invention to provide a simple and inexpensive means of providing a full function keyboard to accommodate the burgeoning applications to which a mobile communication device is adapted.

SUMMARY OF THE INVENTION

A mobile communication device is constructed having a body in which is mounted a viewing screen for displaying user interface communications. A first panel is fixed to the body and includes one half of a full function keyboard and a back cover. A second panel is pivotally mounted on the body for rotation between two positions, namely, a closed position and an open position. The second panel is constructed with inner and outer surfaces located on opposite sides of the panel which are positioned such that the inner surface faces the keyboard of the first panel and the outer surface is exposed in the closed position. In the open position, the second panel is pivoted approximately 180° so that the outer surface faces away from the user of the mobile device while the inner surface is exposed.

To enable the device to be operated as a communication device a communication keypad is constructed in the outer surface of the second panel. To provide the second half of the full function keyboard, the inner surface contains a keyboard which is operatively associated with the keyboard of the first panel in the open position. The screen remains exposed in each position of the second panel. The display which appears on the screen is oriented in a manner consistent with the position of panels.

DESCRIPTION OF THE DRAWINGS

The invention is described in more detail below with reference to the attached drawing in which:

FIG. 3a is a side view of the communications device of this invention in the closed position;

FIG. 3b is a schematic illustration of the display orientation in the closed position;

FIG. 3c is a schematic illustration of the display orientation in the open position;

DESCRIPTION OF THE PREFERRED EMBODIMENT

Figure 1:
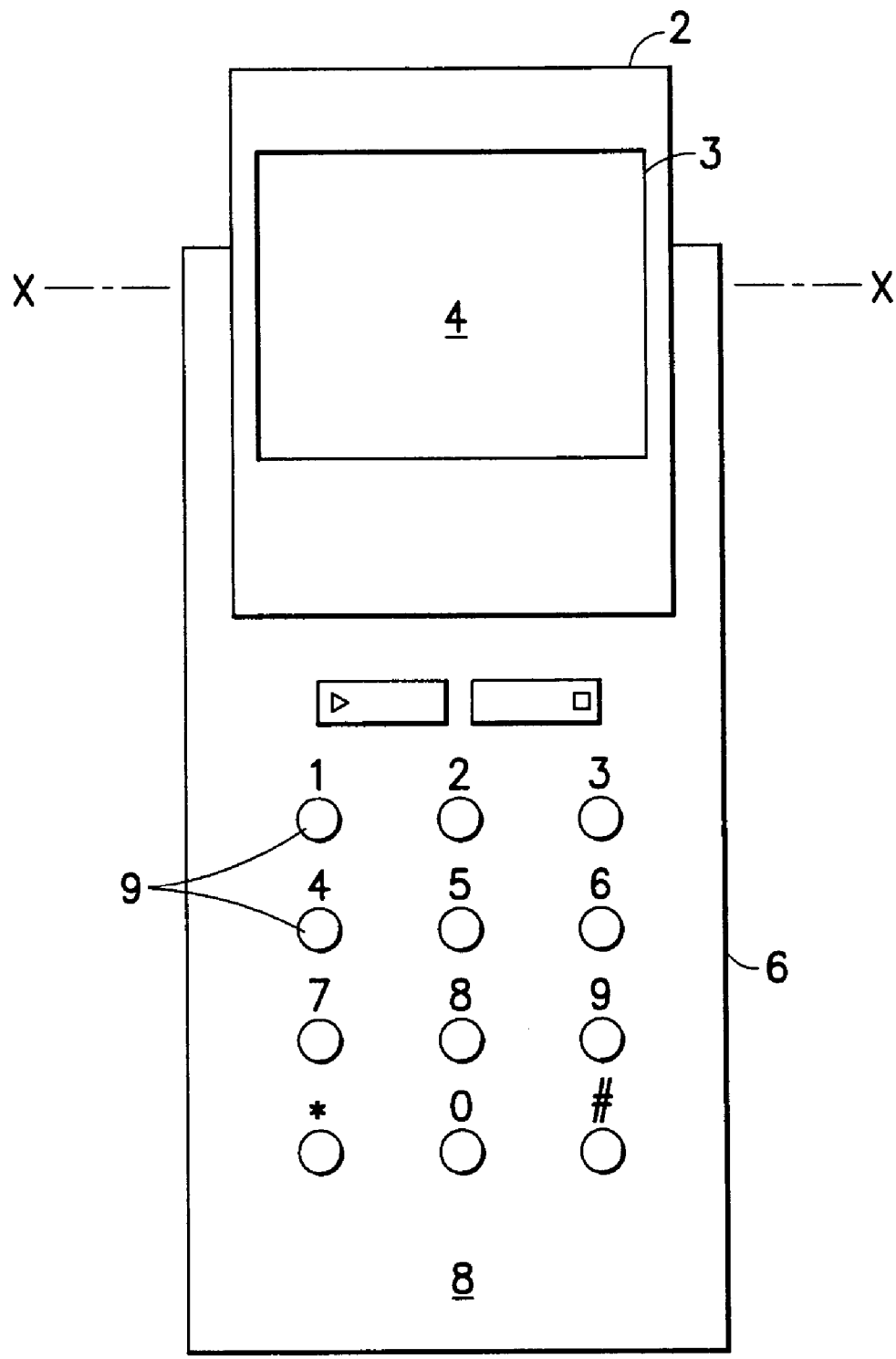
FIG. 1 is a top view of the communications device of this invention in the closed position.
Figure 2:
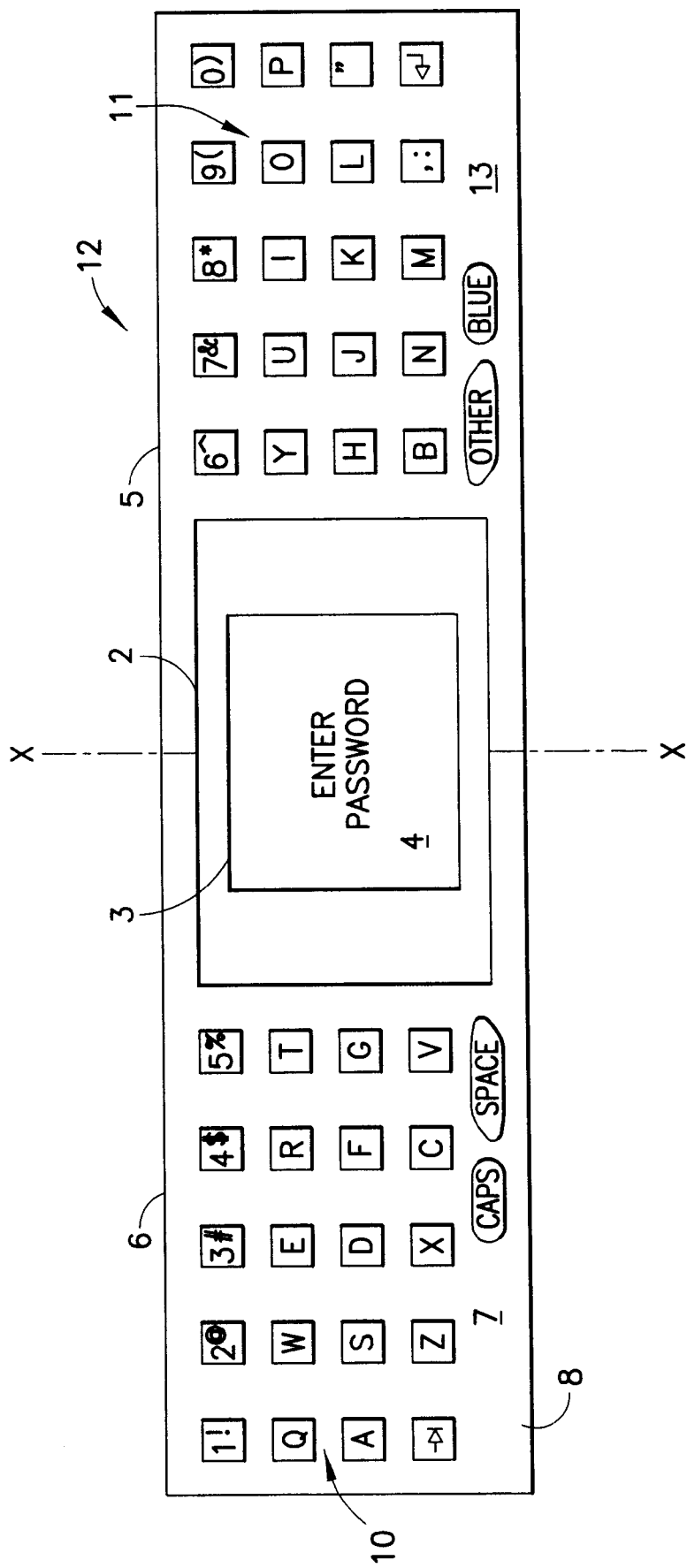
FIG. 2 is a top view of the communications device of this invention in the open position.
Figure 4:
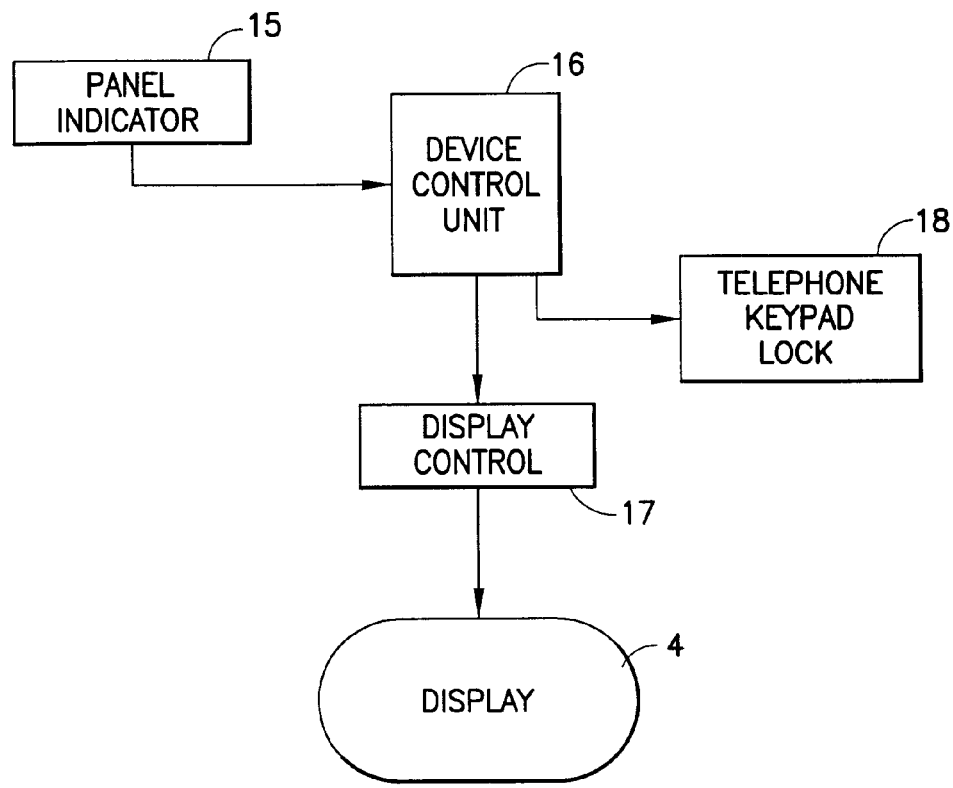
FIG. 4 is a block diagram of the control system of a communication device as it applies to this invention.

A mobile communication device is provided with a full function keyboard. For the purpose of illustration, this invention will be described with reference to a mobile telephone, but is applicable to other devices such as pagers, game units and the like. As shown in FIG. 3a, a mobile telephone 1 is constructed having a body 2. The body 2 encloses a screen 3 which provides a display 4 for communicating pertinent information to the user in response to actions by the user. The mobile telephone 1 is constructed having two panels 5 and 6 which are mounted on the body 2. In FIG. 3, panel 5 is shown fixed to body 2 as a separated component, but it could also be constructed integrally with body 2. Panel 6 is rotatable on the body 2 about an axis x—x as shown in FIGS. 1 and 2.

In a first position, referred to as the closed position, panel 6 is rotated into overlapping alignment with panel 5, as shown in FIG. 3a. Rotating panel 6 has two opposing flat faces 7 and 8. Face 7 is the inner face when panel 6 is in the closed position and face 8 is the outer face in the closed position. In the preferred embodiment, face 8 contains a standard telephone keypad 9 for use when the mobile phone 1 is operating strictly in the communication mode. In the closed position, the device operates as a standard operating mobile telephone with the display 4 of screen 3 oriented in alignment with keypad 9.

To provide the full function keyboard of the preferred embodiment of this invention, the key and button array 12, used for the particular application, is divided in half and arranged on left and right keyboard portions 10 and 11. To facilitate operation of the keyboard, it is designed for thumb actuation by both hands. This makes it convenient to hold the small device in both hands and operate the keyboard portions 10 and 11 accurately and efficiently.

As shown best in FIG. 3, the left hand keyboard portion 10 is constructed on face 7 of rotating panel 6 on the opposite side of telephone keypad 9. The right hand keyboard portion 11 is constructed on upper face 13 of panel 5. A back cover is assembled on the face 14 of panel 5. To insure a compact engagement of panels 5 and 6 in the closed position, the portions of key array 12 on the opposing panel faces 7 and 13 are offset to avoid interference in the closed position.

To operate the keyboard array 12, panel 6 is rotated approximately 180° to the open position to form a substantially flat unit having right and left keyboard portions separated by screen 3 as shown in FIG. 2. By holding the left and right hand portions in either hand, the keyboard, thus extended, can be conveniently operated using thumbs. In the open position, outer face 8 of panel 6 is oriented away from the user.

The display 4 of screen 3 is controlled for orientation in two positions depending on the mode of use. In the closed position, the display 4 is oriented in alignment with the keypad 9, while in the open position the display 4 is aligned with the function key array 12. As shown in FIGS. 3b and 3c, display orientation is rotated 90° between the mobile telephone mode in which panel 6 is in the closed position to the full function mode when panel 6 is in the open position. This is accomplished by providing a panel position indicator 15 which signals control unit 16 when the panel 6 is opened or closed. Control unit 16 may be a microprocessor, display driver or other means including hardware or software. This could be automatic or by a manual button operated by the user. The control unit 16 will signal the display control 17 to orient the position of the display as needed. In addition, in the open position, keypad 9 will be locked in an inoperative mode by telephone keypad lock 18.

Figure 5:
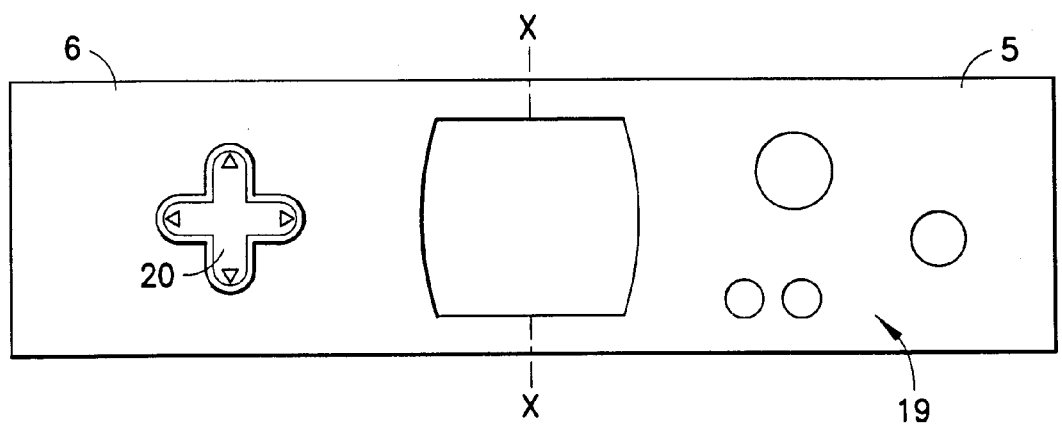
FIG. 5 is a top view of an alternative embodiment of this invention.

In the alternate embodiment shown in FIG. 5, instead of a keyboard, a game controller keypad is provided. The game keyboard consists of action buttons 19 and motion pad 20 constructed in panels 5 and 6 respectively. The telephone keypad 9 is constructed in the reverse side of panel 6, as described above. As a further alternative, the device could be designed without a communication capability and used as a game unit only.

In this manner, a simple and compact keyboard is provided in operative association with a mobile communications device. It should be noted that other key arrays can be used such as the French AZERTY or the German QWERTZ (U). The device would also be useful as a microprocessor based game unit driven by game software or firmware.

We claim:

1. An electronic device for operation in multiple applications comprising:
    a body element having upper and lower faces relative to usage:
        a screen constructed in the upper face of said body element to provide a visible display of information to the user;
        a first panel fixed to the upper face of said body element;
        a second panel mounted on the body element for pivotal motion thereon between open and closed positions, said second panel having first and second faces; said first face accessible to the user in said closed position and said second face accessible to the user in said open position; and
        a function keyboard constructed in two portions, a first portion constructed in the second face of said second panel and a second portion constructed in said first panel, each of said function keyboard portions having an array of keys consistent with a selected function; and
    wherein said function keyboard is exposed for operative use in the open position, and said first and second panels are in overlapping alignment in the closed position and wherein said first and second panels are on opposite sides of said screen in the open position.

2. An electronic device for operation in multiple applications, as described in claim 1, wherein said function keyboard comprises a full function QWERTY key array split in first and second portions constructed respectively in said first and second panels.

3. An electronic device for operation in multiple applications, as described in claim 1, wherein said function keyboard comprises a game controller with multiple functions keys divided between said first and second panels.

4. An electronic device for operation in multiple applications, as described in claim 1, wherein said array of keys on said faces of said panels are offset to prevent interference between the keys of said faces in the closed position.

5. An electronic device for operation in multiple applications, as described in claim 1, wherein said device is mobile communication device and further comprises a communication keypad constructed on said first face of said second panel, said keypad being exposed for operative use in the closed position.

6. An electronic device for operation in multiple applications, as described in claim 5, further including a control unit, said control unit operating to rotate the orientation of the display on the screen consistent with the functional position of the first and second panels so that it is aligned with said communication keypad in the closed position and aligned with said functional keyboard in said open position.

7. An electronic device for operation in multiple applications, as described in claim 6, wherein the display on the screen is rotated 90° between said open and closed positions.

8. An electronic device for operation in multiple applications, as described in claim 6, wherein said orientation is controlled by the position of the second panel.

9. An electronic device for operation in multiple applications, as described in claim 5, wherein the communication device keypad is locked in an inoperative mode in the open position.

10. A function keyboard for use in a mobile communications device, said communications device having a body element, a communications keypad, and a screen for displaying information to the user, said keyboard comprising:
    a first panel fixed to the body element having upper and lower faces;
    a second panel mounted on the body element for pivotal motion thereon between open and closed positions, said second panel having first and second faces; wherein said communication keypad is constructed on the first face of said second panel, said keypad being exposed for operative use in the closed position; and
    wherein said function keyboard is constructed in two portions, a first portion constructed in the second face of said second panel and a second portion constructed in the upper face of said first panel, each of said function keyboard portions having an array of keys consistent with a selected function, wherein said function keyboard is exposed for operative use in the open position, and
    wherein said first and second panels are in overlapping alignment in the closed position and wherein said first and second panels are on opposite sides of said screen in the open position.

11. A mobile communications device for operation in multiple applications comprising:
    a body element having upper and lower faces relative to usage;
    a screen constructed in the body open to provide a visible display of information to the user;
    a first panel fixed to the upper face of said body element;
    a second panel mounted on the body element for pivotal motion thereon between open and closed positions, said second panel having first and second faces; said first face accessible to the user in said closed position and said second face accessible to the user in said open position;
    a communication keypad constructed on the first face of said second panel, said keypad being exposed for operative use in the closed position; and
    a function keyboard constructed in two portions, a first portion constructed in the second face of said second panel and a second portion constructed in said first panel, each of said function keyboard portions having an array of keys consistent with a selected function, wherein said function keyboard is exposed for operative use in the open position; and wherein said first and second panels are in overlapping alignment in the closed position and wherein said first and second panels are on opposite sides of said screen in the open position.

12. A function keyboard for use in an electronic device, said device having a body element, and a screen for displaying information to the user, said keyboard comprising:
a first panel fixed to the body element having upper and lower faces;
a second panel mounted on the body element for pivotal motion thereon between open and closed positions, said second panel having first and second faces; and
wherein said function keyboard is constructed in two portions, a first portion constructed in the second face of said second panel and a second portion constructed in the upper face of said first panel, each of said function keyboard portions having an array of keys consistent with a selected function, wherein said function keyboard is exposed for operative use in the open position; and
wherein said first and second panels are in overlapping alignment in the closed position and wherein said first and second panels are on opposite sides of said screen in the open position.

13. A function keyboard for use in an electronic device, said device having a body element, and a screen for displaying information to the user, said keyboard, as described in claim 12, wherein said portions of said function keyboard cooperate to form a full function QWERTY key array split in said first and second portions.

14. A function keyboard for use in an electronic device, said device having a body element, and a screen for displaying information to the user, said keyboard, as described in claim 12, wherein said portions of said function keyboard comprises a game controller with multiple functions keys divided between said first and second panels.

15. A function keyboard for use in an electronic device, said device having a body element, and a screen for displaying information to the user, said keyboard, as described in claim 12, wherein said array of keys on said faces of said panels are offset to prevent interference between the keys of said faces in the closed position.

16. A function keyboard for use in an electronic device, said device having a body element, and a screen for displaying information to the user, said keyboard, as described in claim 12, wherein, said device is mobile communication device and further comprises a communication keypad constructed on said first face of said second panel, said keypad being exposed for operative use in the closed position.

17. A function keyboard for use in an electronic device, said device having a body element, and a screen for displaying information to the user, said keyboard, as described in claim 16, further comprising a control unit, said control unit operating to rotate the orientation of the display on the screen consistent with the functional position of the first and second panels so that it is aligned with said communication keypad in the closed position and aligned with said functional keyboard in said open position.

18. A function keyboard for use in an electronic device, said device having a body element, and a screen for displaying information to the user, said keyboard, as described in claim 16, wherein the display on the screen is rotated 90° between said open and closed positions.

19. A function keyboard for use in an electronic device, said device having a body element, and a screen for displaying information to the user, said keyboard, as described in claim 17, wherein said orientation is controlled by the position of the second panel.

20. A function keyboard for use in an electronic device, said device having a body element, and a screen for displaying information to the user, said keyboard, as described in claim 16, wherein the communication device keypad is locked in an inoperative mode in the open position.

21. An electronic device for operation in multiple applications comprising:
a body element having upper and lower faces relative to usage:
a screen constructed in the upper face of said body element to provide a visible display of information to the user;
a first panel fixed to the upper face of said body element;
a second panel mounted on the body element for pivotal motion thereon between open and closed positions, said second panel having first and second faces; said first face accessible to the user in said closed position and said second face accessible to the user in said open position; and
a function keyboard constructed in two portions, a first portion constructed in the second face of said second panel and a second portion constructed in said first panel, each of said function-keyboard portions having an array of keys consistent with a selected function, wherein said function keyboard is exposed for operative use in the open position; and
wherein said function keyboard comprises a game controller with multiple functions keys divided between said first and second panels.

22. An electronic device for operation in multiple applications comprising:
a body element having upper and lower faces relative to usage:
a screen constructed in the upper face of said body element to provide a visible display of information to the user;
a first panel fixed to the upper face of said body element;
a second panel mounted on the body element for pivotal motion thereon between open and closed positions, said second panel having first and second faces; said first face accessible to the user in said closed position and said second face accessible to the user in said open position; and
a function keyboard constructed in two portions, a first portion constructed in the second face of said second panel and a second portion constructed in said first panel, each of said function keyboard portions having an array of keys consistent with a selected function, wherein said function keyboard is exposed for operative use in the open position; and
wherein said array of keys on said faces of said panels are offset to prevent interference between the keys of said faces in the closed position.

23. An electronic device for operation in multiple applications comprising:
a body element having upper and lower faces relative to usage:
a screen constructed in the upper face of said body element to provide a visible display of information to the user;
a first panel fixed to the upper face of said body element;
a second panel mounted on the body element for pivotal motion thereon between open and closed positions, said second panel having first and second faces; said first face accessible to the user in said closed position and said second face accessible to the user in said open position; and a function keyboard constructed in two portions, a first portion constructed in the second face of said second panel and a second portion constructed in said first panel, each of said function keyboard portions having an array of keys consistent with a selected function, wherein said function keyboard is exposed for operative use in the open position;

wherein said device is mobile communication device and further comprises a communication keypad constructed on said first face of said second panel, said keypad being exposed for operative use in the closed position; and further wherein said mobile communication device comprises a control unit, said control unit operating to rotate the orientation of the display on the screen consistent with the functional position of the first and second panels so that it is aligned with said communication keypad in the closed position and aligned with said functional keyboard in said open position.

24. An electronic device for operation in multiple applications, as described in claim 23, wherein the display on the screen is rotated 90° between said open and closed positions.

25. An electronic device for operation in multiple applications, as described in claim 23, wherein said orientation is controlled by the position of the second panel.

26. A function keyboard for use in an electronic device, said device having a body element, and a screen for displaying information to the user, said keyboard comprising:

a first panel fixed to the body element having upper and lower faces;

a second panel mounted on the body element for pivotal motion thereon between open and closed positions, said second panel having first and second faces; and wherein said function keyboard is constructed in two portions, a first portion constructed in the second face of said second panel and a second portion constructed in the upper face of said first panel, each of said function keyboard portions having an array of keys consistent with a selected function, wherein said function keyboard is exposed for operative use in the open position; and wherein said portions of said function keyboard comprises a game controller with multiple functions keys divided between said first and second panels.

27. A function keyboard for use in an electronic device, said device having a body element, and a screen for displaying information to the user, said keyboard comprising:

a first panel fixed to the body element having upper and lower faces;

a second panel mounted on the body element for pivotal motion thereon between open and closed positions, said second panel having first and second faces; and wherein said function keyboard is constructed in two portions, a first portion constructed in the second face of said second panel and a second portion constructed in the upper face of said first panel, each of said function keyboard portions having an array of keys consistent with a selected function, wherein said function keyboard is exposed for operative use in the open position; and wherein said array of keys on said faces of said panels are offset to prevent interference between the keys of said faces in the closed position.

28. A function keyboard for use in an electronic device, said device having a body element, and a screen for displaying information to the user, said keyboard comprising:

a first panel fixed to the body element having upper and lower faces;

a second panel mounted on the body element for pivotal motion thereon between open and closed positions, said second panel having first and second faces; and wherein said function keyboard is constructed in two portions, a first portion constructed in the second face of said second panel and a second portion constructed in the upper face of said first panel, each of said function keyboard portions having an array of keys consistent with a selected function, wherein said function keyboard is exposed for operative use in the open position;

wherein, said device is mobile communication device and further comprises a communication keypad constructed on said first face of said second panel, said keypad being exposed for operative use in the closed position; and further wherein said mobile communication device comprises a control unit, said control unit operating to rotate the orientation of the display on the screen consistent with the functional position of the first and second panels so that it is aligned with said communication keypad in the closed position and aligned with said functional keyboard in said open position.

29. A function keyboard for use in an electronic device, said device having a body element, and a screen for displaying information to the user, said keyboard, as described in claim 28, wherein said orientation is controlled by the position of the second panel.

* * * * *